US008969223B2

(12) United States Patent
Goering et al.

(10) Patent No.: US 8,969,223 B2
(45) Date of Patent: Mar. 3, 2015

(54) WOVEN PREFORM, COMPOSITE, AND METHOD OF MAKING THEREOF

(75) Inventors: Jonathan Goering, York, ME (US); Craig Rowles, Portsmouth, NH (US)

(73) Assignee: Albany Engineered Composites, Inc., Rochester, NH (US)

( * ) Notice: Subject to any disclaimer, the term of this patent is extended or adjusted under 35 U.S.C. 154(b) by 383 days.

(21) Appl. No.: 12/893,866

(22) Filed: Sep. 29, 2010

(65) Prior Publication Data

US 2011/0086566 A1  Apr. 14, 2011

Related U.S. Application Data

(60) Provisional application No. 61/247,808, filed on Oct. 1, 2009.

(51) Int. Cl.
*D03D 15/00* (2006.01)
*D03D 17/00* (2006.01)
(Continued)

(52) U.S. Cl.
CPC .............. *B29B 11/16* (2013.01); *B29C 70/222* (2013.01); *B29C 70/48* (2013.01); *D03D 3/08* (2013.01); *D03D 49/04* (2013.01); *D03D 49/20* (2013.01); *B29K 2707/04* (2013.01)
USPC ........... 442/205; 442/181; 442/182; 442/179; 442/210; 442/218; 264/254; 139/384 R; 139/420 R; 139/408; 244/129.3

(58) Field of Classification Search
USPC ............. 442/20, 203–210, 246, 248–254, 59, 442/152, 165, 168, 172, 173, 175, 179, 180, 442/181, 182, 184, 218, 220, 239, 240; 428/34.1, 35.7, 36.1–36.3, 36.6, 36.9, 428/36.91, 102, 221, 292.1, 297.4–301.4, 428/357, 364, 365, 375, 379, 392–396, 457, 428/474.4, 480, 688; 139/384, 420, 408, 139/11; 264/257, 103, 239, 241, 258; 244/129.3, 129.1, 119
See application file for complete search history.

(56) References Cited

U.S. PATENT DOCUMENTS 4,759,985 A  7/1988 Armiger et al.
4,837,117 A  6/1989 Armiger et al.
(Continued)

FOREIGN PATENT DOCUMENTS

DE  10 2008 051 121 A  4/2010
JP  2002-003280 A  1/2002
(Continued)

OTHER PUBLICATIONS

Ross, A., Will Stretch Broken Carbon Fiber Become the New Material of Choice, Jan. 2006, <http://www.compositesworld.com/articles/will-stretch-broken-carbon-fiber-become-the-new-material-of-choice>.*
(Continued)

*Primary Examiner* — Arti Singh-Pandey
*Assistant Examiner* — Frank Vineis
(74) *Attorney, Agent, or Firm* — Frommer Lawrence & Haug LLP; Ronald R. Santucci

(57) ABSTRACT

A three dimensional woven preform, a fiber reinforced composite incorporating the preform, and methods of making thereof are disclosed. The woven preform includes one or more layers of a warp steered fabric. A portion of the warp steered fabric is compressed into a mold to form an upstanding leg. The preform includes the upstanding leg and a joggle in a body portion. The body portion and upstanding leg are integrally woven so there is continuous fiber across the preform. A portion of the warp steered fabric includes stretch broken carbon fibers in the warp direction, and another portion includes conventional carbon fibers. The warp steered fabric can be woven on a loom equipped with a differential take-up mechanism. The warp steered fabric can be a single or multilayer fabric. The preform or the composite can be a portion of an aircraft window frame.

12 Claims, 4 Drawing Sheets

(51) Int. Cl.
   *B32B 5/02*     (2006.01)
   *D03D 11/00*    (2006.01)
   *B64C 1/14*     (2006.01)
   *B29B 11/16*    (2006.01)
   *B29C 70/22*    (2006.01)
   *B29C 70/48*    (2006.01)
   *D03D 3/08*     (2006.01)
   *D03D 49/04*    (2006.01)
   *D03D 49/20*    (2006.01)
   *B28B 1/16*     (2006.01)
   *D03D 3/00*     (2006.01)
   *D03D 1/00*     (2006.01)
   *B29K 707/04*   (2006.01)

(56) References Cited

U.S. PATENT DOCUMENTS

| | | |
|---|---|---|
| 4,856,146 A | 8/1989 | Armiger et al. |
| 4,856,147 A | 8/1989 | Armiger et al. |
| 4,857,385 A | 8/1989 | Armiger et al. |
| 4,863,780 A | 9/1989 | Armiger et al. |
| 5,394,906 A | 3/1995 | Farley |
| 5,599,612 A | 2/1997 | Muraki et al. |
| 6,446,675 B1 | 9/2002 | Goering |
| 6,477,740 B1 | 11/2002 | Hansen |
| 6,935,197 B2 | 8/2005 | Renieri et al. |
| 7,028,950 B2 | 4/2006 | Salmon et al. |
| 7,045,084 B1 * | 5/2006 | Reis et al. .................. 264/138 |
| 7,080,807 B2 | 7/2006 | Olson et al. |
| 7,118,070 B2 | 10/2006 | Abrams et al. |
| 7,175,795 B2 | 2/2007 | Eberth et al. |
| 7,281,686 B2 | 10/2007 | Wood |
| 7,300,693 B2 | 11/2007 | Albers et al. |
| 7,303,700 B2 | 12/2007 | Miller et al. |
| 7,530,531 B2 | 5/2009 | Wood et al. |
| 7,552,896 B2 | 6/2009 | Coak |
| 7,563,497 B2 | 7/2009 | Ma |
| 2005/0042410 A1 | 2/2005 | Sakonjo et al. |
| 2006/0121809 A1 | 6/2006 | Goering |
| 2008/0078876 A1 | 4/2008 | Baggette et al. |
| 2008/0169380 A1 | 7/2008 | Jackson et al. |
| 2008/0169381 A1 | 7/2008 | Ostrem et al. |
| 2009/0120573 A1 | 5/2009 | Martin |
| 2009/0162653 A1 | 6/2009 | Sakata et al. |
| 2009/0202763 A1 * | 8/2009 | Rose et al. ................ 428/36.1 |
| 2010/0285265 A1 * | 11/2010 | Shinoda et al. .............. 428/80 |

FOREIGN PATENT DOCUMENTS

| | | |
|---|---|---|
| WO | WO 2005/082605 A | 9/2005 |
| WO | WO 2005/115728 A | 12/2005 |
| WO | WO 2006/086216 A | 8/2006 |
| WO | WO 2009/088029 A | 7/2009 |
| WO | WO 2009/102650 A | 8/2009 |

OTHER PUBLICATIONS

Black, S., Aligned Discontinuous Fibers Come of Age, Mar. 2008, <http://www.compositesworld.com/articles/aligned-discontinuous-fibers-come-of-age>.*

International Search Report and Written Opinion issued by European Patent Office for corresponding international application PCT/US2010/050749 dated Jan. 27, 2011.

International Search Report and Written Opinion issued by European Patent Office for related international application PCT/US2010/050639 dated Jan. 27, 2011.

* cited by examiner

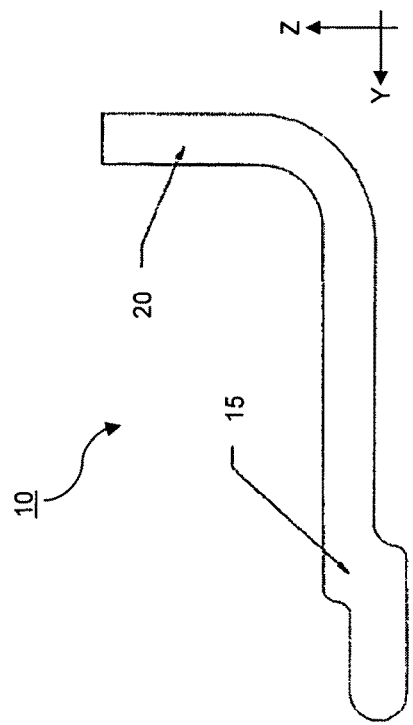
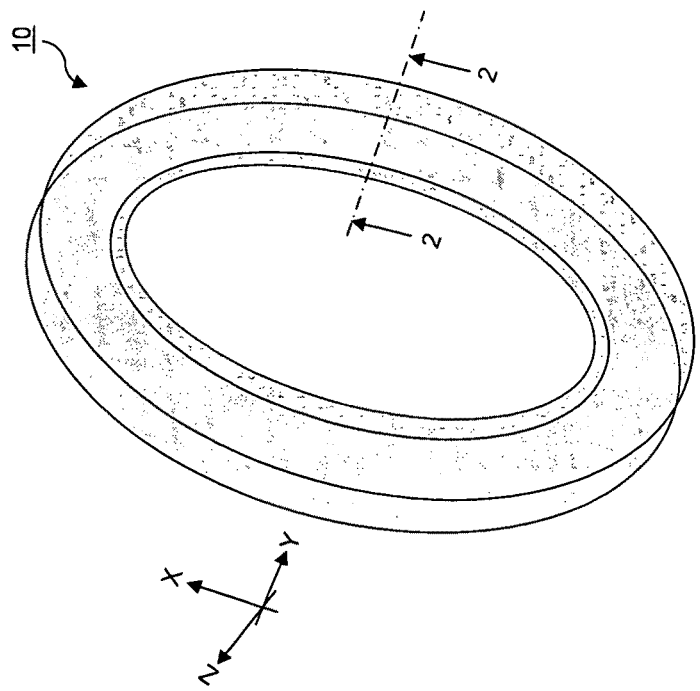

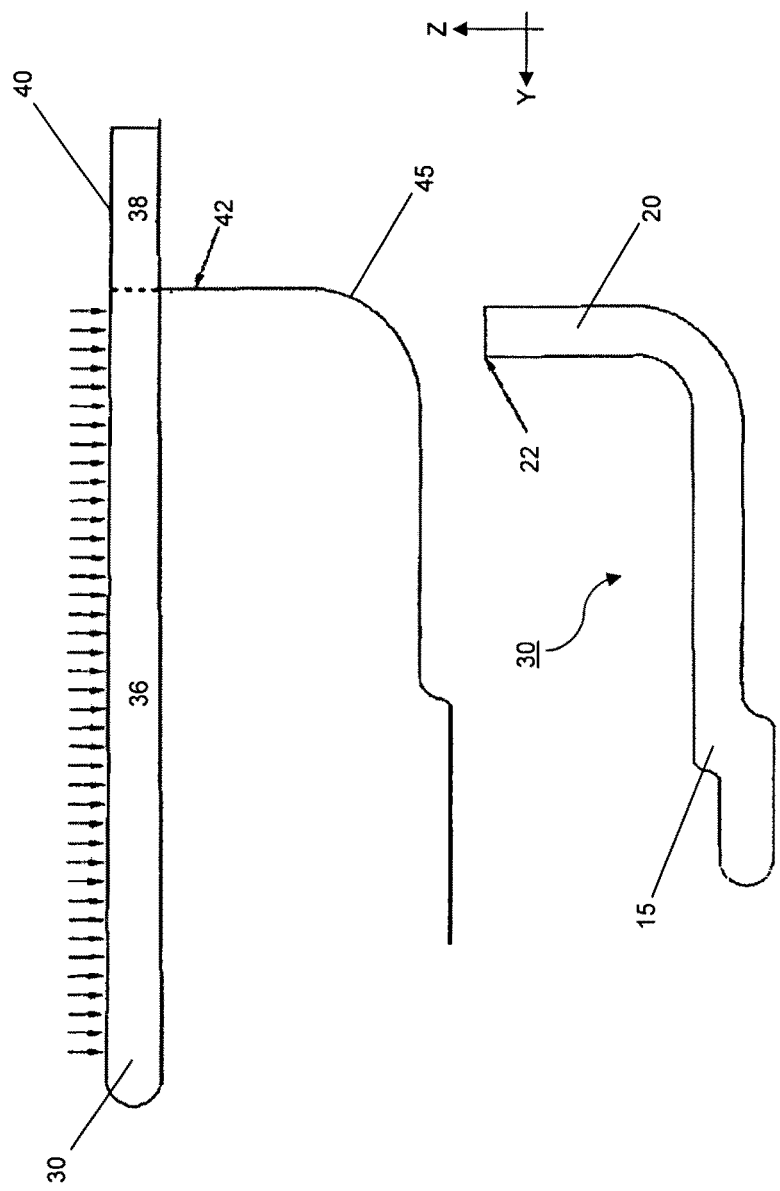

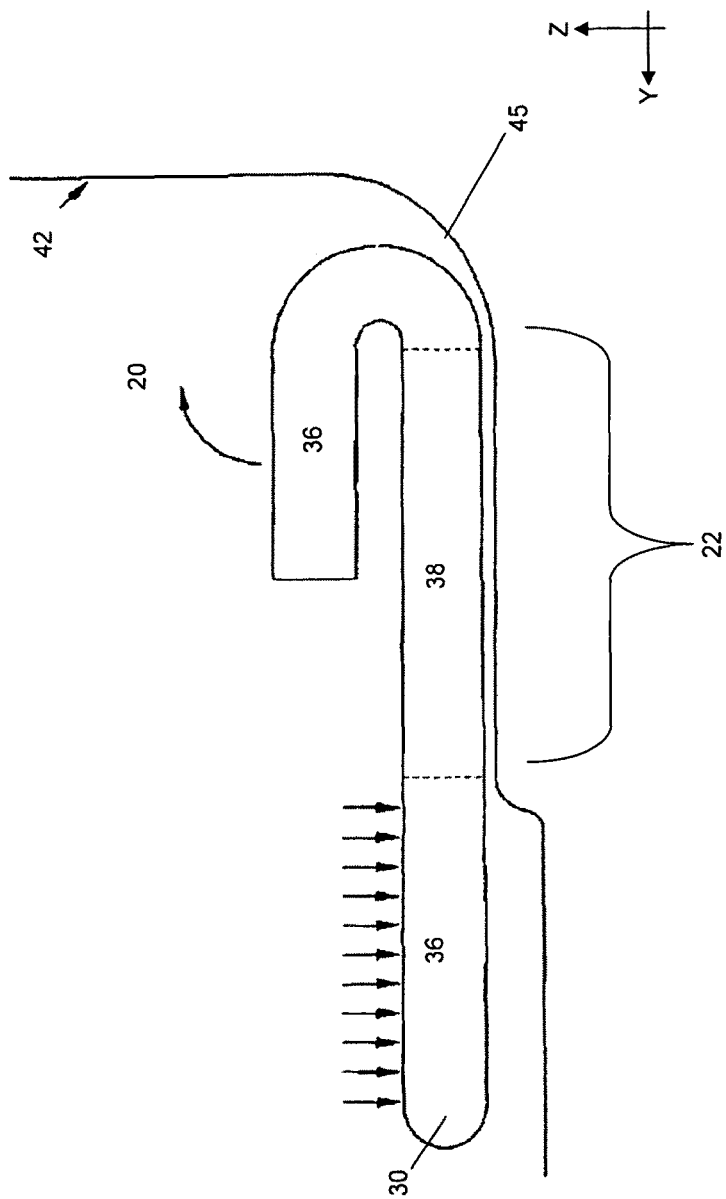

WOVEN PREFORM, COMPOSITE, AND METHOD OF MAKING THEREOF

CROSS REFERENCE TO RELATED APPLICATION

This application claims priority benefits to U.S. Provisional Patent Application Ser. No. 61/247,808 filed Oct. 1, 2009, the entire disclosure of which is incorporated herein by reference.

INCORPORATION BY REFERENCE

All patents, patent applications, documents, references, manufacturer's instructions, descriptions, product specifications, and product sheets for any products mentioned herein are incorporated herein by reference, and may be employed in the practice of the invention.

BACKGROUND OF THE INVENTION

1. Field of the Invention

This invention generally relates to fiber reinforced composites and particularly relates to preforms having woven strips of material used in reinforced composite materials, which can be woven flat and formed into their final shape, the final shape having reinforcement in two or more directions.

2. Description of the Prior Art

The use of reinforced composite materials to produce structural components is now widespread, particularly in applications where their desirable characteristics are sought of being light in weight, strong, tough, thermally resistant, self-supporting and adaptable to being formed and shaped. Such components are used, for example, in aeronautical, aerospace, satellite, recreational (as in racing boats and automobiles), and other applications.

Typically such components consist of reinforcement materials embedded in matrix materials. The reinforcement component may be made from materials such as glass, carbon, ceramic, aramid, polyethylene, and/or other materials which exhibit desired physical, thermal, chemical and/or other properties, chief among which is great strength against stress failure. Through the use of such reinforcement materials, which ultimately become a constituent element of the completed component, the desired characteristics of the reinforcement materials, such as very high strength, are imparted to the completed composite component. The constituent reinforcement materials typically, may be woven, knitted or braided. Usually particular attention is paid to ensure the optimum utilization of the properties for which the constituent reinforcing materials have been selected. Usually such reinforcement preforms are combined with matrix material to form desired finished components or to produce working stock for the ultimate production of finished components.

After the desired reinforcement preform has been constructed, matrix material may be introduced to and into the preform, so that typically the reinforcement preform becomes encased in the matrix material and matrix material fills the interstitial areas between the constituent elements of the reinforcement preform. The matrix material may be any of a wide variety of materials, such as epoxy, polyester, vinyl-ester, ceramic, carbon and/or other materials, which also exhibit desired physical, thermal, chemical, and/or other properties. The materials chosen for use as the matrix may or may not be the same as that of the reinforcement preform and may or may not have comparable physical, chemical, thermal or other properties. Typically, however, they will not be of the same materials or have comparable physical, chemical, thermal or other properties, since a usual objective sought in using composites in the first place is to achieve a combination of characteristics in the finished product that is not attainable through the use of one constituent material alone. So combined, the reinforcement preform and the matrix material may then be cured and stabilized in the same operation by thermosetting or other known methods, and then subjected to other operations toward producing the desired component. It is significant to note at this point that after being so cured, the then solidified masses of the matrix material normally are very strongly adhered to the reinforcing material (e.g., the reinforcement preform). As a result, stress on the finished component, particularly via its matrix material acting as an adhesive between fibers, may be effectively transferred to and borne by the constituent material of the reinforcement preform.

The increased use of composite materials having such fiber preform reinforcements in aircraft fuselage barrels has led to the need for composite window frames. Traditional metallic window frames cannot be used for this application because of differences between the coefficients of thermal expansion of the composite fuselage and the metallic frame. In addition, parasitic barrier plies must be used to eliminate corrosion problems that can exist when some composites and metals are in contact. These barrier plies increase cost of production as well as the overall weight.

Aircraft window frames 10, for example such as that shown in FIG. 1, tend to have the shape of an oval with the major axis of the frame curved to accommodate the cylindrical shape of the fuselage. The cross sectional shape of the window frame 10, such as that shown in FIG. 2, for example, is usually uniform. However, the shape can include complicating features such as an upstanding leg 20 at the outer edge, and/or what are called "joggles" 15 that facilitate sealing the window to the main body of the aircraft. The upstanding leg 20 is a particularly difficult feature to incorporate into a composite design because of the oval shape of the frame 10. Fabricating this feature with conventional fabric or tape requires the use of darts to form the curved shape. These darts, however, increase the hand labor required to fabricate the preform and reduce the strength of the resulting composite.

Solutions that do not require the upstanding leg have been developed, and are currently being used on aircrafts such as the Boeing 787 (See U.S. Patent Publication No. 2008/0078876 and 2008/0169380, for example). This more simple geometry can be fabricated using a compression molding process along with a sheet molding compound such as Hexcel Corporation's HexMC®. However, for structures that require an upstanding leg, there is still a need for a method that can provide continuous fiber in the body as well as the upstanding leg and that may lead to reduced weight and/or improved performance of the frame.

WO 2005115728, for example, relates to a method for making a window frame for installation in the exterior shell of an aircraft. The structure includes an outer flange, an inner flange, and a vertical flange arranged perpendicular to and between these two flanges.

SUMMARY OF THE INVENTION

Accordingly, one object of the present invention is to provide a method of forming a three dimensional preform that has reduced weight and/or improved performance when compared to prior art designs.

Another object of the present invention is to eliminate the weak joints discussed in the prior art structures by integrally weaving different portions of the structure, such as the body and the leg, so there is continuous fiber across all the interfaces.

The invention, according to one exemplary embodiment, is a three dimensional woven preform including one or more layers of a warp steered fabric. A portion of the warp steered fabric is compressed into a mold to form an upstanding leg. The preform may include the upstanding leg and a joggle in a body portion. The body portion and upstanding leg are integrally woven so there is continuous fiber across the preform. A first portion of the warp steered fabric may include stretch broken carbon fibers, a second portion of the warp steered fabric may include conventional carbon fibers, and a third portion of the warp steered fabric may include stretch broken carbon fibers. The warp steered fabric can be woven on a loom equipped with a differential take-up mechanism. The warp steered fabric can be a single or multilayer fabric. The preform can be a portion of an aircraft window frame.

Another exemplary embodiment is a fiber reinforced composite comprising a three dimensional woven preform including one or more layers of a warp steered fabric. A portion of the warp steered fabric is compressed into a mold to form an upstanding leg. The preform may include the upstanding leg and a joggle in a body portion. The body portion and upstanding leg are integrally woven so there is continuous fiber across the preform. A first portion of the warp steered fabric may include stretch broken carbon fibers, a second portion of the warp steered fabric may include conventional carbon fibers, and a third portion of the warp steered fabric may include stretch broken carbon fibers. The warp steered fabric can be woven on a loom equipped with a differential take-up mechanism. The warp steered fabric can be a single or multilayer fabric. The composite can be an aircraft window frame. The composite may be formed by impregnating and curing the woven preform in a matrix material.

Yet another exemplary embodiment is a method of forming a three dimensional woven preform. The method comprises the steps of weaving a warp steered fabric, and laying one or more layers of the warp steered fabric to form a predetermined shape. The method can include compressing a portion of the warp steered fabric into a mold so as to form an upstanding leg. The method can also include the step of forming a joggle in a body portion of the preform. The body portion and upstanding leg are integrally woven so there is continuous fiber across the preform. A first portion of the warp steered fabric may include stretch broken carbon fibers, a second portion of the warp steered fabric may include conventional carbon fibers, and a third portion of the warp steered fabric may include stretch broken carbon fibers. The warp steered fabric can be woven on a loom equipped with a differential take-up mechanism. The warp steered fabric can be a single or multilayer fabric. The preform can be a portion of an aircraft window frame.

Yet another exemplary embodiment of the invention is a method of forming a fiber reinforced composite, comprising the steps of forming a three dimensional woven preform. The method comprises the steps of weaving a warp steered fabric, and laying one or more layers of the warp steered fabric to form a predetermined shape. The method can include compressing a portion of the warp steered fabric into a mold so as to form an upstanding leg. The method can also include the step of forming a joggle in a body portion of the preform. The body portion and upstanding leg are integrally woven so there is continuous fiber across the preform. A first portion of the warp steered fabric may include stretch broken carbon fibers, a second portion of the warp steered fabric may include conventional carbon fibers, and a third portion of the warp steered fabric may include stretch broken carbon fibers. The warp steered fabric can be woven on a loom equipped with a differential take-up mechanism. The warp steered fabric can be a single or multilayer fabric. The composite can be an aircraft window frame. The composite may be formed by impregnating and curing the woven preform in a matrix material.

The preforms of the invention can be woven using any convenient pattern for the warp fiber, i.e., ply-to-ply, through thickness angle interlock, orthogonal, etc. The preform can be woven using any convenient weave pattern, such as plain, twill, satin etc. While carbon fiber is preferred, the invention is applicable to practically any other fiber including but not limited to those that can be stretch broken, e.g. stretch broken carbon fiber, glass, ceramic, and those that cannot be stretch broken or need not be stretch broken, e.g. Discotex® produced by Pepin Associates Inc.

Potential applications for the woven preforms of the invention include any structural application that utilizes contoured frames with a stiffened leg, such as window frames in aircrafts, for example.

The various features of novelty which characterize the invention are pointed out in particularity in the claims annexed to and forming a part of this disclosure. For a better understanding of the invention, its operating advantages and specific objects attained by its uses, reference is made to the accompanying descriptive matter in which preferred, but non-limiting, embodiments of the invention are illustrated and the accompanying drawings in which corresponding components are identified by the same reference numerals.

Terms "comprising" and "comprises" in this disclosure can mean "including" and "includes" or can have the meaning commonly given to the term "comprising" or "comprises" in U.S. Patent Law. Terms "consisting essentially of" or "consists essentially of" if used in the claims have the meaning ascribed to them in U.S. Patent Law. Other aspects of the invention are described in or are obvious from (and within the ambit of the invention) the following disclosure.

BRIEF DESCRIPTION OF THE DRAWINGS

The accompanying drawings, which are included to provide a further understanding of the invention, are incorporated in and constitute a part of this specification. The drawings presented herein illustrate different embodiments of the invention and together with the description serve to explain the principles of the invention. In the drawings:

FIG. 1 is a schematic of an aircraft window frame;

FIG. 2 is a cross-sectional view of the aircraft window frame shown in FIG. 1 along line 2-2;

FIGS. 4-5 show steps involved in forming a three dimensional woven preform, according to one aspect of the invention; and FIG. 6 shows a step involved in forming a three dimensional woven preform, according to one aspect of the invention.

DETAILED DESCRIPTION OF THE PREFERRED EMBODIMENTS

Figure 3:
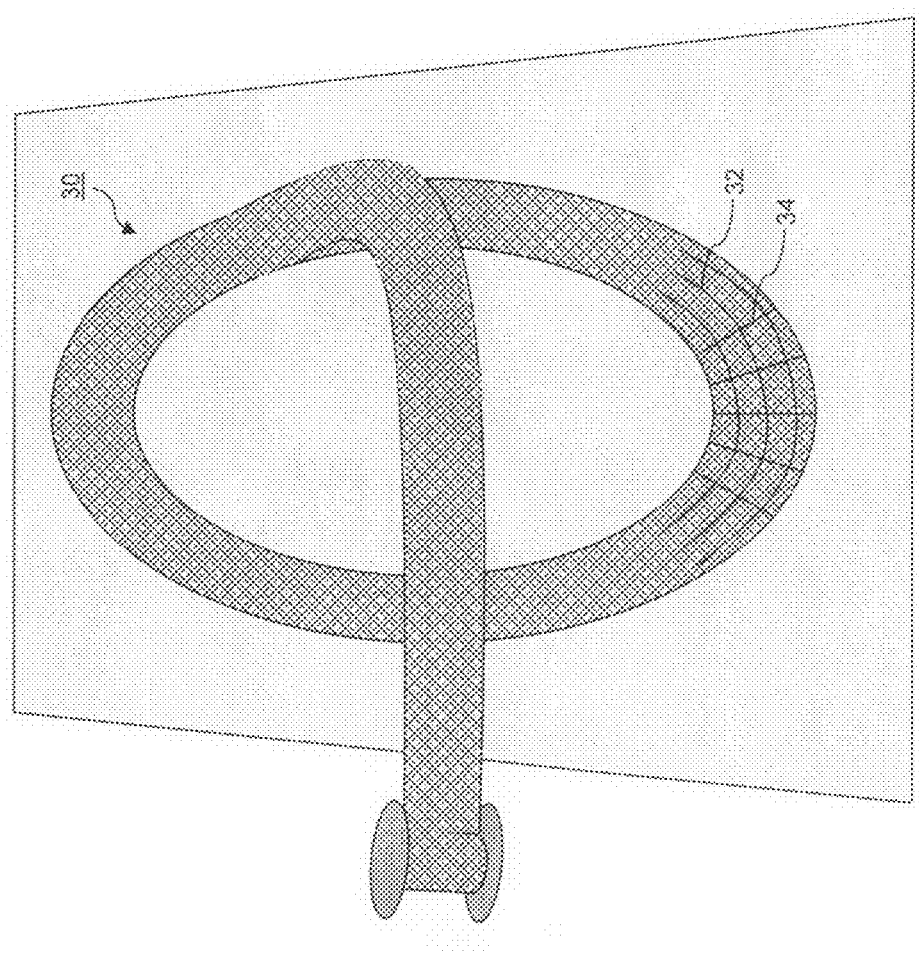
FIG. 3 is a schematic of an oval fabric produced using "steered" weaving, according to one aspect of the present invention.

The instant invention will now be described more fully hereinafter with reference to the accompanying drawings, in which preferred embodiments of the invention are shown.

This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art.

In the following description, like reference characters designate like or corresponding parts throughout the figures. Additionally, in the following description, it is understood that such terms as "upper," "lower," "top," "bottom," "first," "second," and the like are words of convenience and are not to be construed as limiting terms.

Turning now to the figures, the invention according to one embodiment is a method of fabricating a three dimensional woven preform for use in high-strength applications, such as for example, aircraft window frames, composite turbine fan cases, jet engine containment rings, aircraft fuselage frames or in flanged rings for attaching nacelles to aircraft engines. Although the preferred embodiments described herein relate to an aircraft window frame, the present invention is not limited as such. For example, the woven preforms or methods described herein may be used in the manufacture of any of the structures listed above, or the like.

The method according to one exemplary embodiment uses a unique textile manufacturing technique, or what is known as "warp steering." The term "warp steering" refers to a differential take-up system for the warp yarns, which 'steers' them into a required shape, and allows straight weaving, polar weaving or a combination thereof to produce a preform that can practically take any shape in the X-Y plane of the fabric or preform. An example of such a warp steered oval fabric 30 produced using "steered" weaving, according to one aspect of the present invention, is shown in FIG. 3 where oval fabric 30 may be flat in one plane, and has a curved shape in the X-Y plane. In such an arrangement, each warp yarn 32 can have a different path length, similar to lines around a running track, while each weft yarn 34 is always perpendicular or orthogonal to the edges of the fabric. This is to say that at points where a weft yarn 34 may be interwoven with one or more warp yarns 32, the weft yarn 34 is always orthogonal to the one or more warp yarns 32 irrespective of the curvilinear path the warp yarns 32 take.

This technique may be used, according to one exemplary embodiment, to fabricate a composite window frame, such as that described with respect to FIG. 1, which includes features such as an upstanding leg 20 and a "joggle" 15, but does not require the darting required by conventional materials. The method according to this embodiment uses stretch broken carbon fibers ("SBCF") as circumferential fibers in selected regions so that the upstanding leg and joggle can be integrally formed into the preform. The woven preform as a result will have continuous fiber in the circumferential and radial directions of the frame.

Steered weaving according to this method can be carried out on a loom that uses a programmable differential take-up mechanism to produce the desired oval shape of the window frame. In the steered fabric 30, the warp fiber may be continuous in the circumferential direction and the weft fiber is always oriented in the radial direction, relative to the local radius of curvature.

Multiple continuous layers of fabric can be laid on top of one another to build up the desired thickness. Additional layers of fabric with fibers oriented in off-axis directions (again, relative to the local radius of curvature) can also be interspersed between the layers of steered fabric if additional strength and/or stiffness is required. Alternatively, the steered fabric may be woven as a multilayer fabric where two or more layers of the multilayer fabric are integrally held by one or more warp and/or weft yarns in a desired pattern. The fabric can be woven using any convenient pattern for the warp fiber, i.e., ply-to-ply, through thickness angle interlock, orthogonal, etc. The fabric itself can be woven using any conventional weave pattern, such as plain, twill, satin etc. While carbon fiber is preferred, the invention may be applicable to practically any other fiber type including but not limited to those that can be stretch broken, e.g. stretch broken carbon fiber, glass, ceramic, and those that cannot be stretch broken or need not be stretch broken. For example, the fiber used in the present invention can be Discotex®, a discontinuous tow produced by Pepin Associates Inc., which when woven into a textile structure allows the textile structure to stretch in its reinforcement direction, permitting the formation of complex shapes from simple preform starting shapes.

Discotex® is produced by cutting reinforcing yarns or tows into discrete lengths and aligning the cut yarns or tows to form a discontinuous tow. This tow is composed of long, discontinuous and overlapped reinforcing tow segments combined with aligned continuous fiber and an overwrap. The aligned continuous fiber and overwrap fiber are required to handle the DiscoTex® tow during textile operations but they can also be used as the matrix precursor material. In cases where the continuous fiber is not needed in later processing steps it can be removed to yield an all discontinuous textile material. DiscoTex® fabric stretching permits the rapid fabrication of complex contours while preserving fiber orientation and fiber volume fraction. Labor intensive cutting and darting of the fabric can be eliminated, and the technology is applicable to any type of reinforcing yarn including glass, carbon, and ceramic.

It should be noted that the initial preform or fabric 30 is flat. The final shape of the three dimensional preform, however, may be developed using a forming process to generate the upstanding leg, joggle, and general curved shape along the major axis. This forming depends on the use of SBCF in the warp direction of the steered fabric, which will allow the fabric to elongate as needed in the circumferential direction so that the preform is flat with no wrinkles. Conventional fiber may be used in the weft direction, and the width of the fabric may be set to the total arc length of the cross section. SBCF may be used in the weft direction if needed in some local geometry that requires the weft to stretch. When using SBCF, the actual forming process may be engineered to ensure that the total elongation required does not exceed the yield elongation limit of the fiber.

The method, according to one embodiment, can be carried out as illustrated in FIGS. 4-5. In this embodiment, woven preform 30 may be formed using SBCF as warp fiber in one portion 36 of the fabric, for example, and conventional carbon fiber warp in another portion 38 of the fabric. Portion 36 may be, for example, the inner circumferential region of the oval preform, while portion 38 may be, for example, the outer circumferential region. In this case the outside edge 40 of the preform 30 may be clamped to the top of a forming tool 45, for example, and the preform 30 may be compressed into a female mold or forming tool surface 42. The SBCF in portion 36 elongate as the fibers are formed from the smaller radii of the initial preform into the larger radii of the final part. The compression of preform 30 into the female mold or forming tool surface 42 may be accomplished with radial compression, or using one of several known techniques. One such method may be using an inflatable tool that is pressurized to get uniform radial force on the preform 30. Another method may use multiple section tooling to move and fix the preform 30 into place under radial loading for subsequent molding.

It should be noted that the SBCF at the inner edge of the preform can have the highest percent elongation, and the maximum elongation depends on the height of the upstanding leg, the depth of the joggle, the total width of the preform, and the minimum local radius of curvature.

The method according to another embodiment is illustrated in FIG. 6. In this embodiment, woven preform 30 may be formed, for example, using SBCF in the warp direction in edge portions 36, 36 (inner and outer circumferential regions of the oval preform or fabric 30), and conventional carbon fiber warp in the center portion 38 of the fabric. The portion of the preform 30 that will become the upstanding leg 20 is actually woven so that it may be folded back over the main body of the preform. This feature is necessary to ensure that the upstanding leg 20 does not go into circumferential compression during forming.

Preform 30 may be clamped into the tool over the area 22 that contains the conventional warp fiber. The joggle 15 may be then formed by pressing the left side of the preform 36 into the mold 42, and the upstanding leg 20 may be formed by uniformly pushing the right side 36 of the preform 30 up and out into the mold 42. The compression of preform 30 into the female mold or forming tool surface 42 may be, as described earlier, accomplished with radial compression, or using one of the several known techniques. One such method may be using an inflatable tool that may be pressurized to get uniform radial force on the preform 30. Another method may use multiple section tooling to move and fix the preform 30 into place under radial loading for subsequent molding.

It should be noted that the SBCF warp at the inner edge of the preform will usually have the highest percent elongation, and it is this feature that will usually determine if either forming approach is feasible. The maximum elongation also depends on the height of the upstanding leg, the depth of the joggle, the total width of the preform, and the minimum local radius of curvature.

After the fabric is molded to take the desired three dimensional shape, preform 30 can be processed into a composite using a conventional resin infusion method, such as resin transfer molding. For example, the preform according to one embodiment can be processed into an aircraft window frame 10 as shown in FIG. 1. The structure 10 comprises the woven preforms described in the previous embodiments. The preforms may be produced without cutting and darting of the individual plies. Eliminating these cuts and darts improves the strength as well as performance of the resulting structure.

The preforms of the present invention can be woven using any convenient pattern for the warp fiber, i.e., ply-to-ply, through thickness angle interlock, orthogonal, etc. While carbon fiber is preferred, the invention may be applicable to practically any other fiber type that can be stretch broken e.g., carbon, nylon, rayon, fiberglass, cotton, ceramic, aramid, polyester, and metal yarns or fibers.

The warp steered fabric of the invention may be made from materials, such as for example, carbon, nylon, rayon, polyester, fiberglass, cotton, glass, ceramic, aramid, and polyethylene, or any other material commonly known in the art. The final structure may be impregnated with a matrix material, such as for example, epoxy, bismaleimide, polyester, vinylester, ceramic, and carbon, using resin impregnation methods such as resin transfer molding or chemical vapor infiltration, thereby forming a three dimensional composite structure.

Potential applications for the woven preform of the invention include any structural application that utilizes a contoured frame with a stiffened leg, although an aircraft window frame is described as an example herein.

Although preferred embodiments of the present invention and modifications thereof have been described in detail herein, it is to be understood that this invention is not limited to this precise embodiment and modifications, and that other modifications and variations may be effected by one skilled in the art without departing from the spirit and scope of the invention as defined by the appended claims.

What is claimed is:

1. A three dimensional woven preform comprising:
one or more layers of a warp steered fabric,
at least one non-elongatable portion; and
at least one elongatable portion of the warp steered fabric comprising a fiber in the warp direction of the warp steered fabric which will allow the fabric to elongate as needed in a substantially circumferential direction,
wherein the one or more layers of the warp steered fabric are not darted or cut to shape the preform,
wherein said preform comprises an upstanding leg and a joggle in a body portion, the body portion comprising the at least one non-elongatable portion comprising conventional carbon fibers and
wherein the elongatable portion of said warp steered fabric is configured such that the upstanding leg or the joggle or both are formed in a mold, and
wherein the preform includes a first distinct portion of the warp steered fabric including a plurality of stretch broken carbon fibers or discontinuous tows;
a second distinct portion of the warp steered fabric including the conventional carbon fibers and not the stretch broken carbon fibers or discontinuous tows, and
a third distinct portion of the warp steered fabric including the stretch broken carbon fibers; and
wherein the preform is configured to be an aircraft window frame.

2. The preform of claim 1, wherein said body portion including the upstanding leg or the joggle or both are integrally woven so there is continuous fiber across the preform.

3. The preform of claim 1, wherein said warp steered fabric is woven on a loom equipped with a differential take-up mechanism.

4. The preform of claim 1, wherein said warp steered fabric is a multilayer fabric.

5. The preform of claim 1, wherein a warp fiber pattern in said warp steered fabric is a pattern selected from the group consisting of ply-to-ply, orthogonal, and angle interlock.

6. The preform of claim 1, wherein said warp steered fabric is formed by interweaving a plurality of warp and weft yarns or fibers, said warp and weft yarns or fibers being selected from the group consisting of carbon, nylon, rayon, fiberglass, cotton, ceramic, aramid, polyester, and metal yarns or fibers.

7. A fiber reinforced composite comprising a three dimensional woven preform according to claim 1.

8. The composite of claim 7, further comprising a matrix material.

9. The composite of claim 8, wherein said matrix material is a resin, and said composite is formed from a process selected from the group consisting of resin transfer molding and chemical vapor infiltration.

10. The composite of claim 8, wherein said matrix material is selected from the group consisting of epoxy, bismaleimide, polyester, vinyl-ester, ceramic, and carbon.

11. The preform of claim 1, further comprising one or more layers of fabric with fibers oriented in off-axis directions interspersed between the plurality of warp steered fabrics.

12. The three dimensional woven preform of claim 1,
wherein said body portion including the upstanding leg and/or the joggle are integrally woven so there is continuous fiber across the preform, and
wherein the one or more layers of the warp steered fabric are not darted or cut to shape the preform.

\* \* \* \* \*